(12) United States Patent
Wu et al.

(10) Patent No.: US 12,247,449 B2
(45) Date of Patent: Mar. 11, 2025

(54) MODEL BASED ADAPTIVE CONTROL SCHEME FOR PUMP DOWN OPERATION

(71) Applicant: Halliburton Energy Services, Inc., Houston, TX (US)

(72) Inventors: Jian Wu, Houston, TX (US); Atchyuta Ramayya Venna, Houston, TX (US); Siyang Song, Houston, TX (US); Robert P. Darbe, Tomball, TX (US); Sudhir Gupta, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 711 days.

(21) Appl. No.: 17/394,700

(22) Filed: Aug. 5, 2021

(65) Prior Publication Data
US 2023/0038625 A1 Feb. 9, 2023

(51) Int. Cl.
*E21B 23/14* (2006.01)
*E21B 23/08* (2006.01)
*G05D 11/00* (2006.01)

(52) U.S. Cl.
CPC .............. *E21B 23/14* (2013.01); *E21B 23/08* (2013.01); *G05D 11/008* (2013.01)

(58) Field of Classification Search
CPC ........ E21B 23/14; E21B 23/08; G05D 11/008
USPC ....................................................... 700/282
See application file for complete search history.

(56) References Cited

U.S. PATENT DOCUMENTS

| 10,309,176 B2 | 6/2019 | Allmaras et al. |
| 10,961,839 B2 | 3/2021 | Schlosser |
| 2013/0138254 A1 | 5/2013 | Seals et al. |
| 2014/0158350 A1 | 6/2014 | Castillo et al. |
| 2014/0374089 A1 | 12/2014 | Coles |
| 2015/0027736 A1 | 1/2015 | Smaardyk et al. |

(Continued)

FOREIGN PATENT DOCUMENTS

| WO | 2014-204428 | 12/2014 |
| WO | 2015199720 | 12/2015 |

OTHER PUBLICATIONS

SPE-179051-MS, Viassolo, et al., A Novel Method to Control Tool Transport in Well Intervention and Pumpdown Operations in Oil and Gas Services. Mar. 2016.

(Continued)

*Primary Examiner* — Ziaul Karim
*Assistant Examiner* — Joshua T Sanders
(74) *Attorney, Agent, or Firm* — John Wustenberg; C. Tumey Law Group PLLC

(57) ABSTRACT

A system for regulating a pump down operation may include a controller, a motor drive, a parameter estimation unit and a controller design unit. In examples, the controller may be configured to identify a difference between a downhole tension set-point to an actual downhole tension. The motor drive may be configured to adjust a line speed set point of the motor drive based at least in part on the difference from the controller to create an actual line speed from the motor drive to follow the downhole tension set-point. The parameter estimation unit may be configured to produce a fluid drag coefficient, a friction coefficient, and a line speed delay constant. The controller design unit may be configured to send one or more control gains to the controller based at least in part on the fluid drag coefficient, the friction coefficient, and the line speed delay constant.

18 Claims, 5 Drawing Sheets

(56) References Cited

U.S. PATENT DOCUMENTS

| | | |
|---|---|---|
| 2015/0167414 A1 | 6/2015 | Coles et al. |
| 2015/0292318 A1* | 10/2015 | Senger .................... E21B 47/06 166/250.01 |
| 2016/0076325 A1* | 3/2016 | Dykstra ................. E21B 23/14 166/383 |
| 2017/0009543 A1* | 1/2017 | Lovorn ................... E21B 44/00 |
| 2017/0241221 A1* | 8/2017 | Seshadri ............... E21B 47/024 |
| 2020/0040720 A1 | 2/2020 | Zalluhoglu et al. |
| 2020/0072034 A1 | 3/2020 | Zalluhoglu et al. |
| 2020/0095849 A1 | 3/2020 | Demirer et al. |
| 2020/0095860 A1* | 3/2020 | Zalluhoglu ........... E21B 47/022 |
| 2020/0224508 A1 | 7/2020 | Chapman et al. |
| 2020/0270979 A1 | 8/2020 | Hradecky et al. |
| 2020/0400007 A1 | 12/2020 | Wu et al. |
| 2020/0408084 A1 | 12/2020 | Gu et al. |
| 2021/0071477 A1 | 3/2021 | Zhao et al. |
| 2021/0103843 A1 | 4/2021 | Keller et al. |
| 2021/0115779 A1 | 4/2021 | Hopwood et al. |
| 2021/0131259 A1 | 5/2021 | Jeffryes et al. |

OTHER PUBLICATIONS

"Productivity Improvement Case Studies Session V: Extended Lateral Solutions for an Extremely Difficult Well Trajectory".
International Search Report and Written Opinion for Application No. PCT/US2021/045999, dated Apr. 25, 2022.

* cited by examiner

MODEL BASED ADAPTIVE CONTROL SCHEME FOR PUMP DOWN OPERATION

BACKGROUND

After drilling a borehole in a subterranean formation for recovering desirable hydrocarbons such as oil and gas lying beneath the surface, smooth wireline tool transportation is important for delivering downhole tools. Horizontal boreholes may be drilled to increase the surface of the borehole in a reservoir containing desirable hydrocarbons. Precise wireline tool transportation may be difficult in horizontal boreholes. Downhole tools used to complete the well for production after the borehole is drilled may be employed.

To achieve wireline tool transportation in horizontal boreholes a pump down operation must overcome forces of friction. However, key model parameters may vary during pump down operation. For example, the drag coefficient and friction coefficient between downhole tool and horizontal borehole may vary in terms of time. Drag coefficient may be implemented to determine a varying fluid drag force during pump down operation. The propagation time constant for the line speed from surface to the downhole tool is largely dependent on the depth, and will increase as depth increases. All these factors contribute for a nonlinear process with varying parameters resulting in complex modeling. Thus, achieving desired wireline tool transportation in horizontal boreholes is a challenge.

BRIEF DESCRIPTION OF THE DRAWINGS

These drawings illustrate certain aspects of some examples of the present disclosure and should not be used to limit or define the disclosure.

DETAILED DESCRIPTION

As discussed below, systems and methods are discussed to transport a wireline tool in horizontal boreholes at a desired downhole tension. To maintain desired downhole tension, key parameters may be modeled with a control specification resulting in a smooth downhole tool velocity or a specified set point. Additionally, methods to control downhole tension are based at least in part on a model parameter estimation function and subsequent control gain tuning function. This may allow the control system to adapt and accommodate changes downhole to such a desired performance. This may allow for regulating a desired downhole tension set-point that may be a constant set-point or a specified trajectory.

Figure 1:
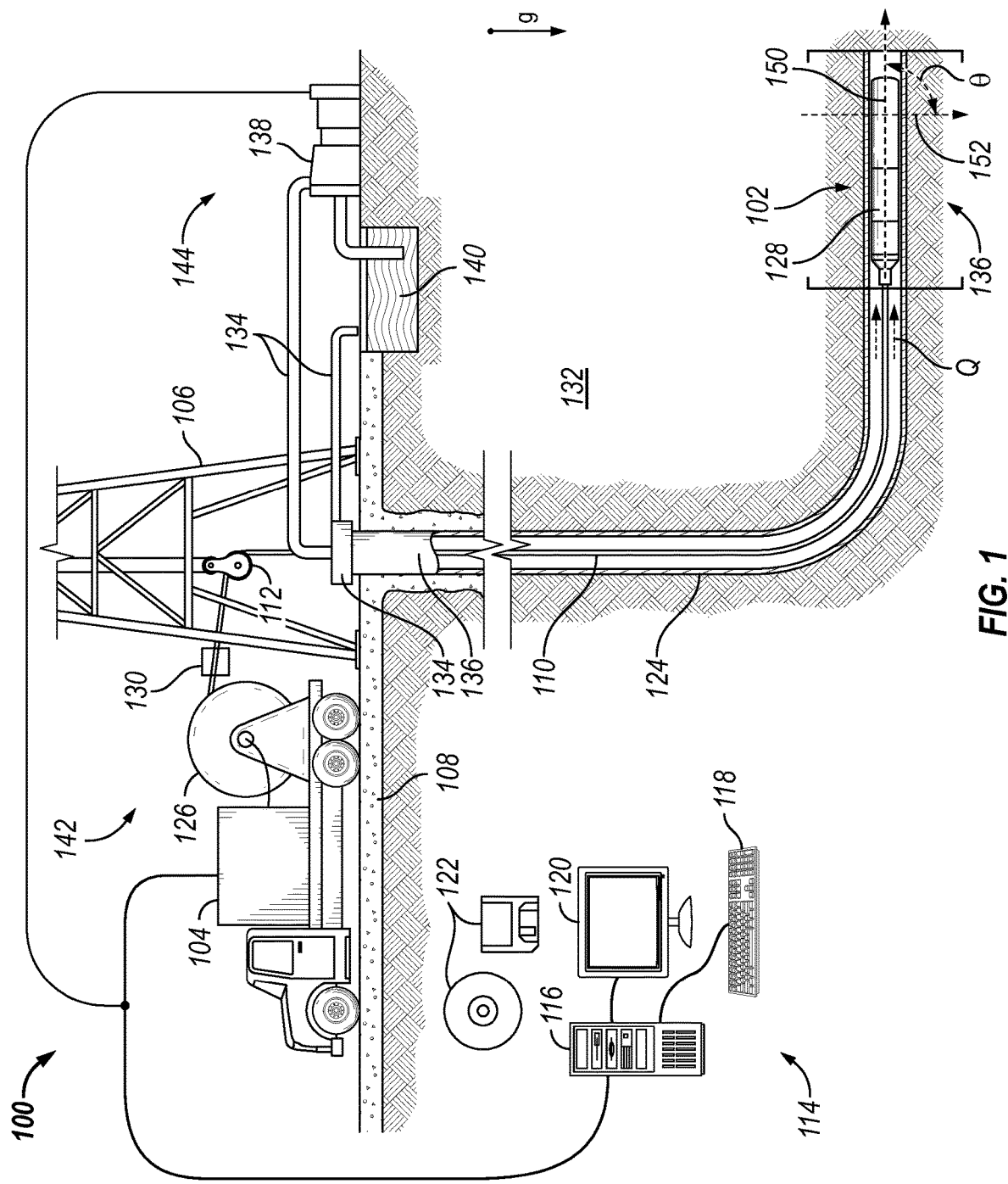
FIG. 1 illustrates a pump down operation.

FIG. 1 illustrates a cross-sectional view of a pump down operation 100. As illustrated, pump down operation 100 may comprise downhole tool 102 attached a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, downhole tractor, or the like. In some embodiments, conveyance 110 may provide mechanical suspension, as well as electrical connectivity, for downhole tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. As disclosed herein, real-time is defined as operations being performed during any downhole operation which may include downhole measurement operations and or the like. Additionally, real-time data is defined as measurements taken during downhole operations during any type or form of measurement operations. Processing may alternatively occur downhole or may occur both downhole and at surface. In some embodiments, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102. Additionally, information handling system 114 may be integrated within any form of a machine learning algorithm.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, read only memory (ROM), and/or other types of nonvolatile memory. Additional components of the information handling system 114 may include one or more disk drives, one or more network ports for communication with external devices as well as various input and output (I/O) devices, such as an input device 118 (e.g., keyboard, mouse, etc.) and a video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, adjacent to rig 106 is a surface measurement tool 130 which may determine surface measurements of borehole 124 in real-time. Surface measurement tool 130 may be attached to conveyance 110 between drum 126 and one or more sheave wheels 112 via any implementation. Surface measurement tool 130 may include a load cell and an encoder. In examples, a load cell may provide the amount of pull-on conveyance 110 at the surface of borehole 124 in Real-time. Such measurements may be combined as to be discussed later. In examples, as conveyance 110 passes through surface measurement tool 130 an encoder may be implemented to provide real-time measurements. Real-time measurements may include line speed $v_{line}$ and depth d. Additionally, as d is measured in real-time its corresponding inclination angle $\theta$ may be determined through depth-inclination lookup table in real-time. As illustrated, vehicle 104, drum 126, and surface measurements may be sub-components of motor drive 142.

Information handling system 114 may comprise a safety valve which controls the hydraulic pressure that drives drum 126 on vehicle 104 which may reel up and/or release conveyance 110 which may move downhole tool 102 up and/or down borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull-on conveyance 110 such that once that limit is exceeded; further pull-on conveyance 110 may be prevented. Borehole 124 may include horizontal segment 136. Downhole tool 102 may be conveyed through the entirety of borehole 124 including horizontal segment 136.

In examples, rig 106 may also include a pump 138 connected to information handling system 114. Information handling system 114 may comprise a safety valve which controls the flow rate of drilling fluid in borehole 124. Drilling fluid may enter borehole 124 from feed line 134 and provide pressure to downhole tool 102 at the end of borehole 124. Additionally, retention pit 140 may be utilized for storage or any standard implementation. As illustrated, pump 138, retention pit 140, and feed line 134 may be subcomponents of pump drive 144.

Information handling system 114 may also at least partially control pump down operation 100. To control pump down operation 100, information handling system 114 may be connected to pump drive 144 or motor drive 142. Motor drive 142 regulates conveyance 110 and pump drive 144 regulates flow rate. During pump down operation 100, as previously described, motor drive 142 may provide real time measurements such as d and $\theta$ as well as actual line speed which is identified as $v_{line}$. Similarly, pump drive 144 may provide real-time measurements of actual flow rate Q. Additionally, downhole tool 102 may include downhole tension sensor 128. Measurements from downhole tension sensor 128 may be sent to information handling system 114 in real-time via any mechanism. Information handling system 114 may process measurements from downhole tension sensor 128 and surface measurement tool 130 to form actual downhole tension $F_{dh}$. Additionally, real-time measurements from motor device 142 and pump drive 144 may be sent to information handling system 114 via any mechanism.

Real-time data may be sent from information handling system 114 which may allow information handling system 114 to control pump down operation 100. As previously stated, pump drive 144 and motor drive 142 may transmit data and real-time measurements as parameters to information handling system 114, which may then maintain a user input identified as a downhole tension set-point (noted below as $F_0$) of downhole tool 102. For example, motor drive 142 may receive a line speed set-point 146 from information handling system 114. Upon receiving line speed set-point 146 from information handling system 114 motor drive 142 provides acceleration to downhole tool 102 via conveyance 110 until the line speed set-point 146 via conveyance 110. Vehicle 104 may provide a conveyance mechanism by which downhole tool 102 is accelerated however any known conveyance mechanism is acceptable to accelerate downhole tool 102. Further, pump drive 144 may receive a desired flow rate 148 of downhole fluids from information handling system 114. Upon receiving desired flow rate 148 from information handling system 114 pump drive 144 alters flowrate to borehole 124 via a pumping mechanism, until a desired flowrate is realized. Flowrate of borehole 124 may provide an acceleration to downhole tool 102. Any known pumping mechanism may be utilized to deliver a desired flow rate to borehole 124 via feed line 134 is acceptable. One skilled in the art will appreciate both the pump drive 144 and motor drive 142 are known techniques for providing acceleration to downhole tool 102. Each mechanism may be performed in parallel and separately.

During control pump operation 100, downhole tool 102 may be accelerated as previously described in horizontal segment 136 of borehole 124 to a tool velocity $v_{tool}$. While downhole tool 102 travels through horizontal segment 136 it may be described by its $\theta$. Inclination angle $\theta$ may be described by angular displacement between the tool axis 150 and z axis 152. The z axis 152 is constant and points vertically downward parallel with the direction of gravity g. Whereas tool axis runs parallel through downhole tool 102 and changes with conveyance 110 through formation 132. Inclination angle is nearly 0 degrees when downhole tool 102 is pointing vertically downward, but as downhole tool 102 is in horizontal segment 136 $\theta$ is nearly 90 degrees.

Figure 2:
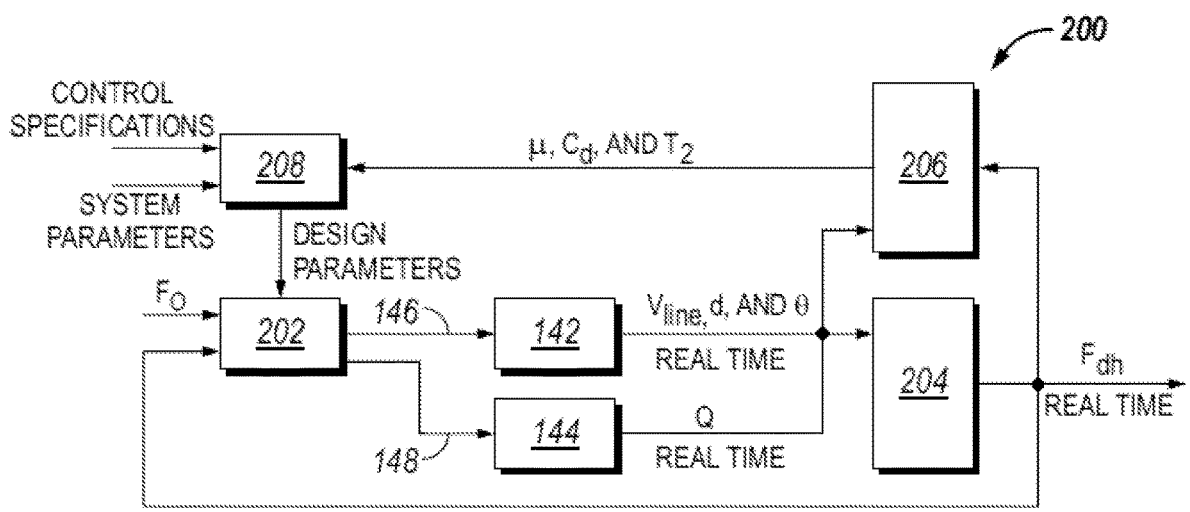
FIG. 2 illustrates a pump down operation algorithm.

FIG. 2 illustrates a system control loop 200 which may be function, operate, and may be stored on one or more information handling systems 114. As discussed below, system control loop 200 may be configured to control pump down operation 100 (e.g., referring to FIG. 1). System control loop 200 may implement a proportional-integral-derivative or a proportional-integral controller 202 (PID/PI controller 202, downhole tool dynamics 204, a parameter estimation unit 206, and an online controller design unit 208. During operations, downhole tool 102 may be in horizontal segment 136 of borehole 124 when PID/PI controller 202 may produce an output of a line speed set-point 146 as an input to motor drive 142 as to be discussed later. Motor drive 142 regulates $v_{line}$ to be close to its line speed set-point 146, $v_{line}$ directly affects actual downhole tension. In other examples, PID/PI controller 202 may produce an output of a desired flow rate 148 as an input to pump drive 144. Pump drive 144 regulates Q to be close to its desired flow rate 148, Q directly affects actual downhole tension. PID/PI Controller 202 may provide desired flow rate 148 and line speed set-point 146 to pump drive 144 and motor drive 142 in parallel or select one or the other individually.

Similarly, a desired flow rate 148 may be designated by an operator and sent as an input to pump drive 144. Additionally, desired flow rate 148 may be produced as an output of PID/PI controller 202 and received by pump drive 144 as an input. Thus, pump drive 144 may deliver an acceleration to downhole tool 102. The acceleration delivered to downhole tool 102 from pump drive 144 may be based off desired flow rate 148. While downhole tool 102 is accelerating through horizontal segment 136 of borehole 124, As previously described motor drive 142, pump drive 144, and downhole tension sensor 128 may send measurements as inputs to information handling system 114 in real-time. Upon receiving inputs, measurements such as $v_{line}$, θ, Q, d, $F_{dh}$ may be processed and stored into ques by information handling system 114 in real-time within downhole dynamics 204.

Previously processed measurements such as $v_{line}$ and $F_{dh}$ may be input into parameter estimation unit 206 as real-time data, illustrated in FIG. 2. Additionally, real-time data such as θ, d, and Q may be input into parameter estimation unit 206. Parameter estimation unit 206 may process measurements to be combined with key model parameters such as fluid drag coefficient $C_d$ and friction coefficient μ between downhole tool 102 and borehole 124. Standard tool parameters such as W, M, V, and $R_0$ which are, respectively, weight, mass and volume of, and radius, may combined into parameter estimation unit 206. In other examples, $F_{dh}$ may also be calculated in Equation (1) below:

$$F_{dh} = (W - \rho V g)(\cos\theta - \mu\sin\theta) + \frac{1}{2}\rho\pi R^2\left(\frac{Q}{\pi(R0^2 - R^2)} - v_{tool}\right)^2 C_d - M\dot{v}_{tool} \quad (1)$$

wherein ρ is fluid density, R is casing, and g is acceleration of gravity. In other examples, different equations may be used to solve for $F_{dh}$.

As previously described, dynamic key model parameters may be difficult to estimate while downhole tool 102 is in horizontal segment 136 of borehole 124. For example, μ and $C_d$ often vary during pump down operation 100 (e.g., referring to FIG. 1). During operations, processed measurements, standard tool properties, and $F_{dh}$ are collected and stored within parameter estimation unit 206. The processed measurements stored in parameter estimation unit 206 may be utilized in Equation (1) to find additional parameters. Identification of parameters may be further utilized to find coefficients of matrices of with Equation (2) below:

$$Ax = b \quad (2)$$

where A and b are coefficient matrices or vectors calculated using the processed measurements and standard tool properties, and x is either [μ $C_d$], [μ], or [$C_d$].

Equation (2) may be refined further with a least square processed using Equation (3) below:

$$x = (A'A)^{-1}A'b \quad (3)$$

In other examples, any known least square equation may be implemented for Equation (3). Another system parameter is propagation time constant for $v_{line}$ from the surface to downhole tool 102 or line speed delay constant $T_2$. Changes to $v_{line}$ would propagate downwards to downhole tool 102 at the speed of sound in steel to become tool speed $v_{tool}$. $T_2$ may be calculated using the following Equation (4) below:

$$T_2 = \frac{d}{c_s}, \quad (4)$$

where $c_s$ is the speed of sound in steel at about 5000 m/s and d is depth. Similarly, Equation (4) may be applied for calculating the flow rate propagation delay time constant $T_3$ where the speed of sound in fluid is used instead. Thus, as previously described parameter estimation unit 206 may estimate μ, $C_d$, and/or $T_2$. Additionally, parameter estimation unit 206 may operate in real-time with real-time rata and produce pre-specified outputs. Further, $C_d$ may be utilized to determine a fluid drag force. Fluid drag force may be interpreted as the summation of force due to drag acting on downhole tool 102 during pump down operation 100. Similarly, μ may be used to determine a friction between a downhole tool and a borehole in which the downhole tool is disposed, and $T_2$ identifies a time delay between a line speed of the motor drive and a velocity of a downhole tool.

Controller design unit 208 may utilize μ, $C_d$, and $T_2$ as inputs from parameter estimation unit 206. Additionally, control specifications such as closed loop response time and System Parameters, that may include tool dimensions, casing diameters, fluid density, or additional System Parameters, serve as inputs to controller design unit 208. The primary function of controller design unit 208 is to configure PID/PI controller 202.

PID/PI controller 202 used in system control loop 200, may implement a linearized process model G(s) at operating points of interests is first established within controller design unit 208 using Equation (5) below:

$$G(s) = \frac{Ks + M}{(T_1 s + 1)(T_2 s + 1)}, \quad (5)$$

where K is a function of [μ, $C_d$] and $T_2$ are received as inputs from parameter estimation unit 206 as previously described, M is the mass of the tool, and $T_1$ is the reaction time constant for the drum 126 (e.g., referring to FIG. 1). Additionally, a desired closed loop response may be defined as a first order system with a desired time constant of $T_a$. For maintaining closed loop stability, $T_a$ should be set at least larger than $(T_1 + T_2)$.

Design unit 208 accommodates a PID/PI controller 202 with transfer function expressed in Equation (6) or Equation (7) below:

$$G_c(s) = K_p + \frac{K_i}{s} + K_d s \quad (6)$$

$$G_c(s) = K_p + \frac{K_i}{s}. \quad (7)$$

accordingly, the closed loop response may be expressed in the equation:

$$\frac{G_c(s)G(s)}{1 + G_c(s)G(s)} = \frac{1}{T_a s + 1}. \quad (8)$$

Design unit 208 may manipulate equation (8) by comparing coefficients between the numerator and the denominator, the explicit solution of PID/PI controller 202 gains $K_p$, $K_i$, $K_d$ are obtained wherein $K_p$ is proportional gain, $K_i$ integral gain, and $K_d$ derivative gain. PID/PI controller 202 gains may be expressed in the equation below:

$$K_p = \frac{T_1 + T_2}{MT_a - K}, \quad K_i = \frac{1}{MT_a - K} \text{ and } K_d = \frac{T_1 T_2}{MT_a - K} \quad (9)$$

The values of control gains, discussed below, and $T_2$ may be updated periodically as key model parameters such as $\mu$, $C_d$ and $T_2$ are estimated in real-time. Once the new key model parameters are estimated, the Equation (9) may be adopted to tune the controller gains. $K_p$ and $K_i$ in Equation (9) may be utilized for the PI controller cases. This online controller tuning function may also support the controller gain retuning due to operating point changes since they would lead to the parameter changes of the linearized process model of Equation (5). The aforementioned equations within design unit 208 may operate with real-time data and produce control gains as real-time data.

In examples, controller design unit 208 may output control gains $K_d$, $K_p$, and $K_i$ to PID/PI controller 202 as Equation (6) or Equation (7) as previously discussed. PID/PI controller 202 may be programmed to receive $F_0$ and $F_{dh}$ and determine a difference. The difference may be implemented with the transfer function formed from control gains $K_d$, $K_p$, and $K_i$ of PID/PI controller 202. PID/PI controller 202 may then follow $F_{dh}$ to $F_0$ resulting in an updated line speed set-point 146 and/or a desired flow rate 148. During pump down operations, updating line speed set-point 146, and/or desired flow rate 148 reduces the difference between $F_0$ and $F_{dh}$. As PID/PI controller 202 operates in Real-time and $F_{dh}$, $K_d$, $K_p$, and $K_i$ may be input into PID/PI controller 202 in Real-time, thus line speed set-point 146 and/or desired flow rate 148 serve as inputs to motor drive 142 and/or pump drive 144 in real-time.

Figure 3:
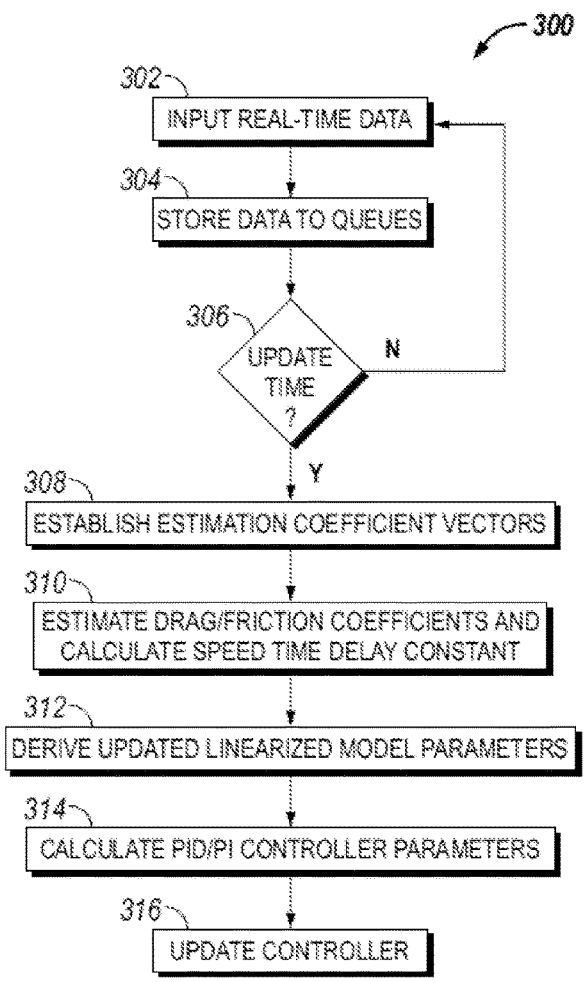
FIG. 3 illustrates a parameter estimation and controller tuning workflow.

FIG. 3 illustrates workflow 300 correlating to system control loop 200 (e.g., referring to FIG. 2) for online parameter estimation and controller tuning. Real-time measurements such as $v_{line}$, inclination angle $\theta$, Q, d, $F_{dh}$ serve as is inputs to block 302. In block 304 the real-time data is saved into queues for quick access. The queues implemented in block 304 may be organized such that each processed measurement has its own queue or processed measurement may be stored in queues. A decision in block 306 may be determined if it is time to update the gains and the processed measurement are in the queue. If the proper measurements are stored then workflow 300 increments to block 308, if not workflow 300 returns to block 301.

In block 308 estimation coefficient vectors are constructed. Estimation coefficient vectors may be A, b, and x as previously described. Once the coefficient vectors are constructed, block 310 estimates $\mu$, $C_d$, and $T_2$. Block 312 utilizes the transfer function of PID/PI controller 202 (e.g., referring to FIG. 2) and subsequently its closed loop response. With the transfer function and closed loop response initiated, block 314 derives controller control gains from calculations performed in block 310 to yield a controller with a $K_d$, $K_p$, and $K_i$. Such controller control gains may be employed to construct PID/PI controller 202 as previously described. Upon construction of PID/PI controller 202 (e.g., referring to FIG. 2), block 316 may update controller with newly acquired real-time data.

Figure 4:
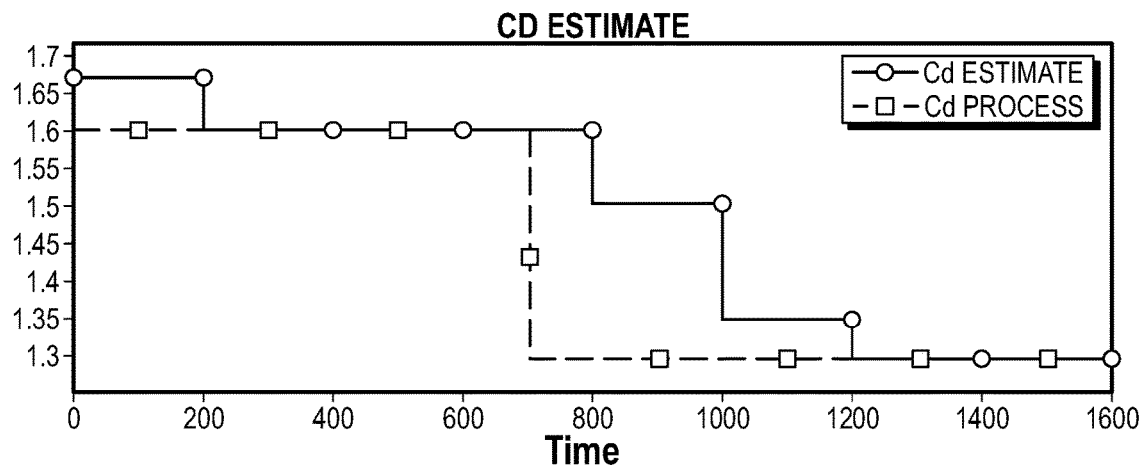
FIG. 4 illustrates plotted drag coefficient simulation and processed results.

FIG. 4 is a graph showing simulated data analyzed with system control loop 200 on pump down operation 100. In the simulation, standard tool properties and measurements utilized are: R0=0.199 ft, R=0.182 ft, W=824 lb, V=3.125 cuft, $T_1$=1.5 seconds, and Q=14 bpm. Inclinations utilized previously performed field data set. The depth ranged from 11500-16100 feet, $F_0$ was set to 200 lb, the window time or the length of the real data (queue) for estimation was set at 400 seconds, and update time for tuning the control gains was 200 seconds. The resulting estimation and processed results for the specified parameters are plotted in FIG. 4 wherein the Y-axis represents fluid drag coefficient $C_d$ and the X-axis is time. Time is incremented every 200 seconds as specified for tuning the control parameters as previously stated. Additionally, processed results of fluid drag coefficient $C_d$ are plotted in FIG. 4 as well. As shown in FIG. 4, a step change for $C_d$ from 1.6 to 1.3 was introduced at 700 seconds. The estimated $C_d$ was able to track the change and reached 1.35 at 1000 seconds and 1.3 at 1200 seconds. FIG. 4 illustrates a change to $C_d$ at 700 sec from 1.6 to 1.3. Thus, by using real-time estimation function, the system can track the $C_d$ changes from 1.6 to 1.5 to 1.35 to 1.3, rather than an incorrect 1.6.

Figure 5A:
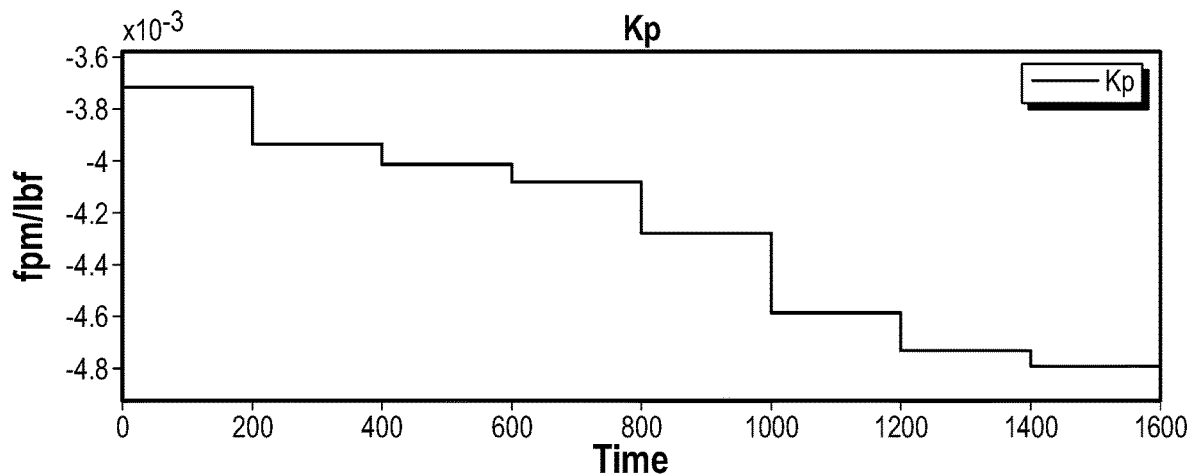
FIGS. 5A, 5B, and 5C illustrate plotted results of control gain tuning functions.
Figure 5B:
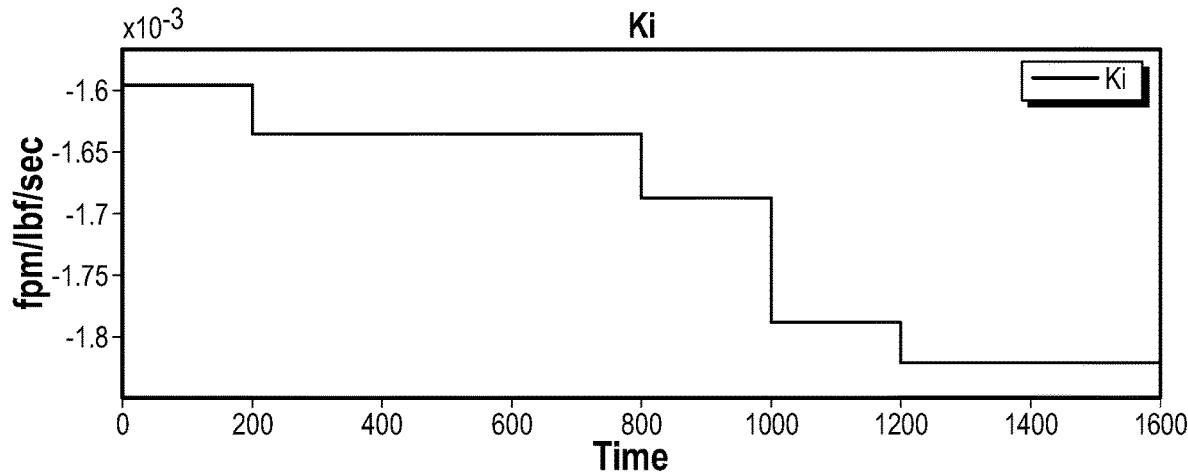
Figure 5C:
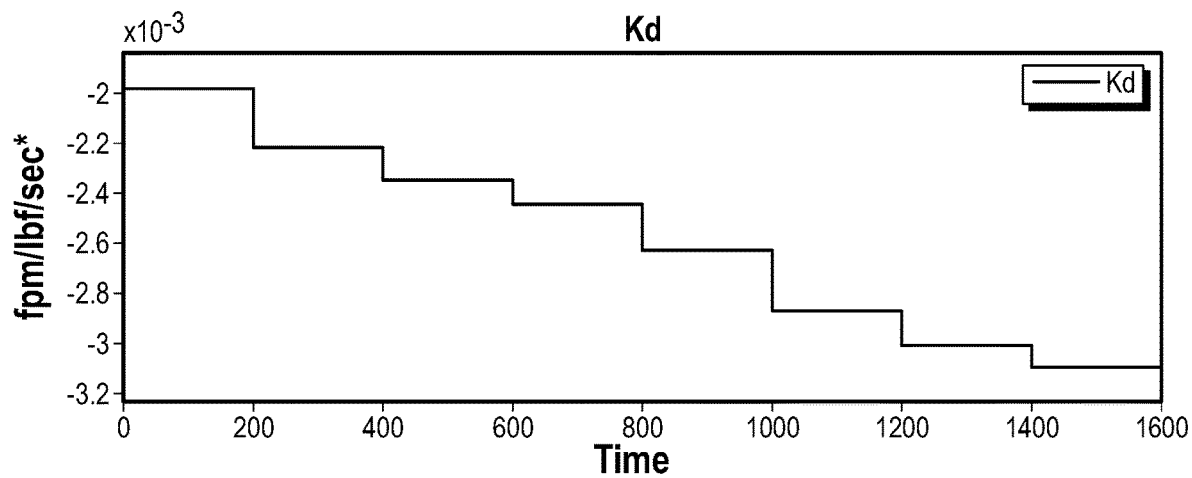

The simulation may be further expressed in terms of controller parameters $K_p$, $K_i$, and $K_d$. For example, FIG. 5A shows $K_p$ plotted wherein $K_p$ is plotted in fpm/lbf, $K_i$ is plotted in fpm/lbf/sec, and $K_d$ is plotted in fpm/lbf*sec. The X-axis is time incremented every 200 seconds as specified by time for tuning the control gain tuning functions as previously stated. Similarly, FIGS. 5B and 5C show $K_i$ and $K_d$ plotted respectfully wherein the Y-axis represents the gain of and the X-axis is time incremented every 200 seconds as specified by time for tuning the control parameters as previously stated. FIGS. 5A, 5B, and 5C demonstrate with online parameter estimation and gain tuning functions, the $K_p/K_i/K_d$ would make adaptive changes with the estimated parameters of Cd and/or mu, thereby ensuring the desired control performance.

Figure 6:
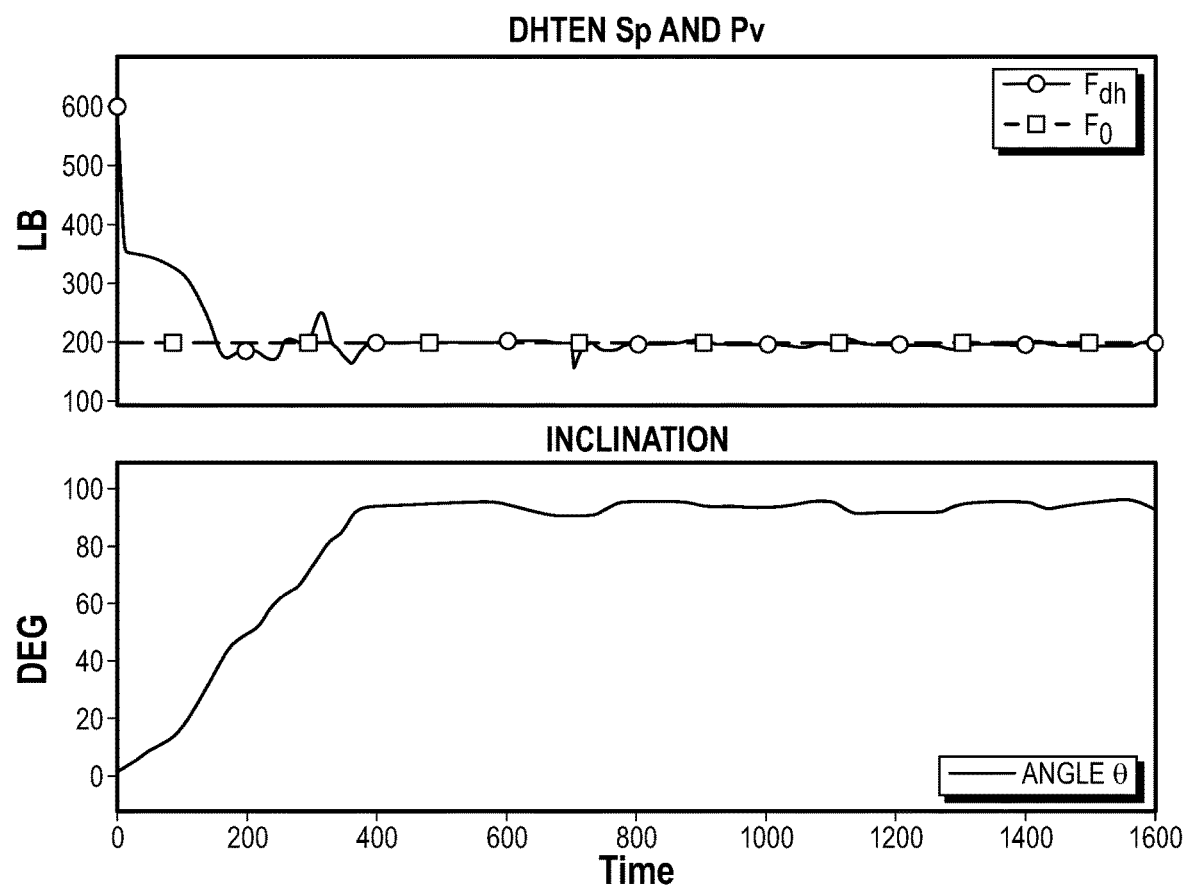
FIG. 6 illustrates simulation results from downhole tension set-point and actual downhole measurements plotted in parallel to inclination angle.

The simulation may be further expressed in terms of $F_0$, $F_{dh}$, and inclination angle $\theta$. Specifically, FIG. 6 plots $F_0$ and $F_{dh}$ against each other wherein the Y-axis represents Pounds (LB), and the X-axis is time incremented every 200 seconds as specified by time for tuning the control parameters as previously stated. $F_0$ is set to a constant 200 LB and the X-axis is time incremented every 200 seconds as specified by time for tuning the control parameters as previously stated. It may be observed, that as time progresses in the course of the simulation system control loop 200 (e.g., referring to FIG. 2) successfully maintains $F_{dh}$ close to $F_0$. Additionally, the inclination angle is plotted parallel to $F_0$ and $F_{dh}$ wherein the Y-axis is represented as Degrees (DEG) of inclination and the X-axis is represented as previously stated. FIG. 6 primarily illustrates that $F_{dh}$ remains close to $F_0$ with time incrementing.

Figure 7:
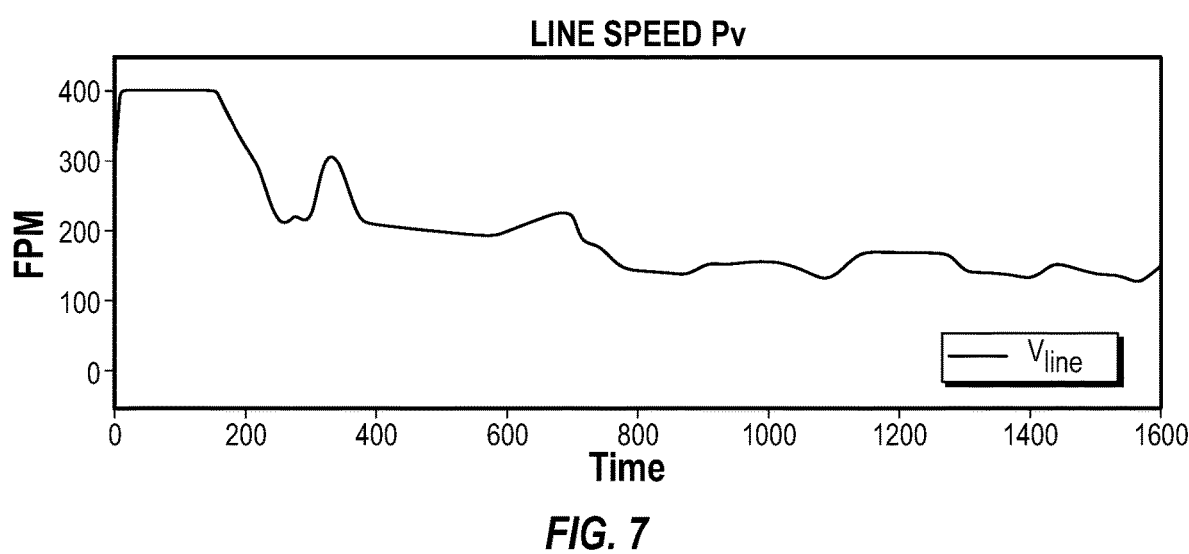
FIG. 7 illustrates velocity of the downhole tool.

The simulation may be further expressed in terms of $v_{line}$. For example, FIG. 7 shows $v_{line}$ plotted wherein the Y-axis represents velocity of downhole tool 102 (e.g., referring to FIG. 1) in feet per minute (FPM) and the X-axis is time incremented every 200 seconds as specified by time for tuning the control gains as previously stated. Despite the significant $C_d$ change, inclination angle $\theta$, and friction variations, the proposed adaptive control system was able to maintain $F_{dh}$ close to $F_0$.

The implementation of system control loop 200 (e.g., referring to FIG. 2) in a downhole environment improves current technology with novel additions of real-time parameter estimation and gain tuning functions. Specifically, estimation of dynamic key model parameters and then designing and tuning the control gain tuning functions parameters accordingly. The proposed model based adaptive control scheme provides high-quality control performance through its online parameter estimation and automatic gain tuning features.

The preceding description provides various embodiments of systems and methods of use which may contain different method steps and alternative combinations of components. It should be understood that, although individual examples may be discussed herein, the present disclosure covers all combinations of the disclosed examples, including, without limitation, the different component combinations, method step combinations, and properties of the system.

Statement 1. A system for a pump down operation may comprise a controller disposed on an information handling system and configured to identify a difference between a downhole tension set-point to an actual downhole tension; a motor drive connected to the information handling system and configured to adjust a line speed set-point of the motor drive based at least in part on the difference from the controller to create an actual line speed from the motor drive to follow the downhole tension set-point; a parameter estimation unit disposed on the information handling system and connected to the motor drive, configured to produce a fluid drag coefficient, a friction coefficient, and a line speed delay constant; and a controller design unit disposed on the information handling system and connected to at least the parameter estimation unit and the controller, configured to send one or more control gains to the controller based at least in part on the fluid drag coefficient, the friction coefficient, and the line speed delay constant.

Statement 2. The system of statement 1, wherein the controller is a proportional integral derivative controller or a proportional integral controller.

Statement 3. The system of statements 1 or 2, wherein the friction coefficient identifies a friction between a downhole tool and a borehole in which the downhole tool is disposed.

Statement 4. The system of statements 1-3, wherein the fluid drag coefficient identifies a drag force provided by the fluid to a downhole tool.

Statement 5. The system of statements 1-4, wherein the line speed delay constant identifies a time delay between a line speed of the motor drive and a velocity of a downhole tool.

Statement 6. The system of statements 1-5, wherein the controller, the parameter estimation unit, and the controller design unit operate on one or more information handling systems.

Statement 7. The system of statements 1-6, wherein the parameter estimation unit is configured to accept real time data that includes at least one of measured downhole tension, depth, inclination, measured flow rate and measured line speed.

Statement 8. The system of statements 1-7, further comprising a pump drive connected to the information handling system and configured to adjust a desired flow rate of the pump drive based at least in part on the difference from the controller to create an actual flow rate from the pump drive to follow the downhole tension set-point, wherein the pump drive and the motor drive are attached to the information handling system and the controller.

Statement 9. A system for a pump down operation may comprise a controller disposed on an information handling system and configured to identify a difference between a downhole tension set-point to an actual downhole tension; a pump drive connected to the information handling system and configured to adjust a desired flow rate of the pump drive based at least in part on the difference from the controller to create an actual flow rate from the pump drive to follow the downhole tension set-point; a parameter estimation unit disposed on the information handling system and connected to at least the pump drive, configured to produce a fluid drag coefficient, a friction coefficient, and a line speed delay constant; and a controller design unit disposed on the information handling system and connected to at least the parameter estimation unit and the controller, configured to send one or more control gains to the controller based at least in part on the fluid drag coefficient, the friction coefficient, and the line speed delay constant.

Statement 10. The system of statement 9, wherein the controller is a proportional integral derivative controller or a proportional integral controller.

Statement 11. The system of statements 9 or 10, wherein the friction coefficient identifies a friction between a downhole tool and a borehole in which the downhole tool is disposed or the fluid drag coefficient identifies a drag force provided by the fluid to the downhole tool.

Statement 12. The system of statements 9-11, wherein the line speed delay constant identifies a time delay between a line speed at a motor drive and a velocity of a downhole tool.

Statement 13. The system of statements 9-12, wherein the controller, the parameter estimation unit, and the controller design unit operate on one or more information handling systems.

Statement 14. The system of statements 9-13, further comprising a motor drive connected to the information handling system and configured to adjust a line speed set-point of the motor drive based at least in part on the difference from the controller to create an actual line speed from the motor drive to follow the downhole tension set-point, wherein the pump drive and the motor drive are attached to the information handling system and the controller.

Statement 15. The system of statements 9-15, wherein the parameter estimation unit is configured to accept real time data that includes at least one of measured downhole tension, depth, inclination, measured flow rate and measured line speed.

Statement 16. A method for controlling a tension on a conveyance downhole may comprise inputting a downhole tension set-point into a controller; identifying a difference between the downhole tension set-point and an actual downhole tension with the controller; adjusting a line speed set-point of a motor drive and a desired flow rate of a pump drive based at least in part on the difference from the controller to follow the downhole tension set-point; producing a fluid drag coefficient, a friction coefficient, and a line speed delay constant with a parameter estimation unit that is connected to the motor drive and the pump drive; and sending one or more control gains to the controller based at least in part on the fluid drag coefficient, the friction coefficient, and the line speed delay constant.

Statement 17. The method of statement 16, wherein the controller is a proportional integral derivative controller or a proportional integral controller.

Statement 18. The method of statements 16 or 17, wherein the friction coefficient identifies a friction between a downhole tool and a borehole in which the downhole tool is disposed or the fluid drag coefficient identifies a drag force provided by the fluid to the downhole tool.

Statement 19. The method of statements 16-18, wherein the controller, the parameter estimation unit, and the controller design unit operate on one or more information handling systems, and wherein the pump drive and the motor drive are attached to the one or more information handling systems and the controller.

Statement 20. The method of statements 16-19, inputting real time data into the parameter estimation unit, wherein the real time data includes at least one of measured downhole tension, depth, inclination, measured flow rate and measured line speed.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system for a pump down operation comprising:
   a controller disposed on an information handling system and configured to identify a difference between a downhole tension set-point to an actual downhole tension;
   a motor drive connected to the information handling system and configured to adjust a line speed set-point of the motor drive based at least in part on the difference from the controller to create an actual line speed from the motor drive to follow the downhole tension set-point;
   a parameter estimation unit disposed on the information handling system and connected to the motor drive, configured to produce a fluid drag coefficient, a friction coefficient, and a line speed delay constant; and
   a controller design unit disposed on the information handling system and connected to at least the parameter estimation unit and the controller, configured to send one or more control gains to the controller based at least in part on the fluid drag coefficient, the friction coefficient, and the line speed delay constant, wherein the line speed delay constant identifies a time delay between a line speed of the motor drive and a velocity of a downhole tool and is calculated using a depth of the wireline in the wellbore a La speed of sound in the wireline.

2. The system of claim 1, wherein the controller is a proportional integral derivative controller or a proportional integral controller.

3. The system of claim 1, wherein the friction coefficient identifies a friction between a downhole tool and a borehole in which the downhole tool is disposed.

4. The system of claim 1, wherein the fluid drag coefficient identifies a drag force provided by the fluid to a downhole tool.

5. The system of claim 1, wherein the controller, the parameter estimation unit, and the controller design unit operate on one or more information handling systems.

6. The system of claim 1, wherein the parameter estimation unit is configured to accept real time data that includes at least one of measured downhole tension, depth, inclination, measured flow rate and measured line speed.

7. The system of claim 1, further comprising a pump drive connected to the information handling system and configured to adjust a desired flow rate of the pump drive based at least in part on the difference from the controller to create an actual flow rate from the pump drive to follow the downhole tension set-point, wherein the pump drive and the motor drive are attached to the information handling system and the controller.

8. A system for a pump down operation comprising:
   a controller disposed on an information handling system and configured to identify a difference between a downhole tension set-point to an actual downhole tension;
   a pump drive connected to the information handling system and configured to adjust a desired flow rate of the pump drive based at least in part on the difference from the controller to create an actual flow rate from the pump drive to follow the downhole tension set- point;
   a parameter estimation unit disposed on the information handling system and connected to at least the pump drive, configured to produce a fluid drag coefficient, a friction coefficient, and a line speed delay constant; and
   a controller design unit disposed on the information handling system and connected to at least the parameter estimation unit and the controller, configured to send one or more control gains to the controller based at least in part on the fluid drag coefficient, the friction coefficient, and the line speed delay constant, wherein the line speed delay constant identifies a time delay between a line speed of the motor drive and a velocity of a downhole tool and is calculated using a depth of the wireline in the wellbore and a speed of sound in the wireline.

9. The system of claim 8, wherein the controller is a proportional integral derivative controller or a proportional integral controller.

10. The system of claim 8, wherein the friction coefficient identifies a friction between a downhole tool and a borehole in which the downhole tool is disposed or the fluid drag coefficient identifies a drag force provided by the fluid to the downhole tool.

11. The system of claim 8, wherein the controller, the parameter estimation unit, and the controller design unit operate on one or more information handling systems.

12. The system of claim 8, further comprising a motor drive connected to the information handling system and configured to adjust a line speed set-point of the motor drive based at least in part on the difference from the controller to create an actual line speed from the motor drive to follow the downhole tension set-point, wherein the pump drive and the motor drive are attached to the information handling system and the controller.

13. The system of claim 8, wherein the parameter estimation unit is configured to accept real time data that includes at least one of measured downhole tension, depth, inclination, measured flow rate and measured line speed.

14. A method for controlling a tension on a conveyance downhole comprising:
inputting a downhole tension set-point into a controller;
identifying a difference between the downhole tension set-point and an actual downhole tension with the controller;
adjusting a line speed set-point of a motor drive and a desired flow rate of a pump drive based at least in part on the difference from the controller to follow the downhole tension set-point;
producing a fluid drag coefficient, a friction coefficient, and a line speed delay constant with a parameter estimation unit that is connected to the motor drive and the pump drive; and
sending one or more control gains to the controller based at least in part on the fluid drag coefficient, the friction coefficient, and the line speed delay constant, wherein the line speed delay constant identifies a time delay between a line speed of the motor drive and a velocity of a downhole tool and is calculated using a depth of the wireline in the wellbore and a speed of sound in the wireline.

15. The method of claim 14, wherein the controller is a proportional integral derivative controller or a proportional integral controller.

16. The method of claim 14, wherein the friction coefficient identifies a friction between a downhole tool and a borehole in which the downhole tool is disposed or the fluid drag coefficient identifies a drag force provided by the fluid to the downhole tool.

17. The method of claim 14, wherein the controller, the parameter estimation unit, and the controller design unit operate on one or more information handling systems, and wherein the pump drive and the motor drive are attached to the one or more information handling systems and the controller.

18. The method of claim 14, inputting real time data into the parameter estimation unit, wherein the real time data includes at least one of measured downhole tension, depth, inclination, measured flow rate and measured line speed.

* * * * *